(12) United States Patent
Markham et al.

(10) Patent No.: US 10,951,735 B2
(45) Date of Patent: Mar. 16, 2021

(54) PEER BASED DISTRIBUTION OF EDGE APPLICATIONS

(71) Applicant: General Electric Company, Schenectady, NY (US)

(72) Inventors: Joel Frederick Markham, Niskayuna, NY (US); Andrew William Berner, Waterford, NY (US); Austars Raymond Schnore, Jr., Scotia, NY (US); Wesley Michael Skeffington, Ballston Lake, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 275 days.

(21) Appl. No.: 15/805,557

(22) Filed: Nov. 7, 2017

(65) Prior Publication Data
US 2019/0141163 A1 May 9, 2019

(51) Int. Cl.
*G06F 15/16* (2006.01)
*H04L 29/08* (2006.01)
(Continued)

(52) U.S. Cl.
CPC ........ *H04L 67/327* (2013.01); *G05B 19/4185* (2013.01); *G06F 9/5038* (2013.01);
(Continued)

(58) Field of Classification Search
CPC . H04L 67/327; H04L 41/046; H04L 41/0893; H04L 41/0896; H04L 67/1074;
(Continued)

(56) References Cited

U.S. PATENT DOCUMENTS 7,363,498 B2 4/2008 Hennessey et al.
7,653,689 B1 1/2010 Champagne et al.
(Continued)

OTHER PUBLICATIONS

Fortino, Giancarlo et al., "Using P2P, GRID and Agent technologies for the development of content distribution networks", Future Generation Computer Systems, vol. 24, Issue: 3, 2008, DOI: 10.1016/j.future.2007.06.007, (pp. 180-190, 11 total pages).
(Continued)

*Primary Examiner* — David R Lazaro
*Assistant Examiner* — Mariegeorges A Henry
(74) *Attorney, Agent, or Firm* — Buckley, Maschoff & Talwalkar LLC (57) ABSTRACT

According to some embodiments, system and methods are provided, comprising providing an application module; receiving a request from at least one master agent for application content at the application module, wherein the application content is for execution at one or more assets; executing the application module to determine the distribution of the application content to at least one node located in each of the one or more assets, wherein execution of the application module further comprises: determining an origin of the request and a requesting hierarchy associated with the request; exchanging metadata associated with the requesting hierarchy and metadata associated with the requested application content; determining whether to distribute the application content based on an analysis of the exchanged metadata; distributing the application content to the at least one node located in the asset based on the analysis; and generating an operating response of the asset based on the distributed application content. Numerous other aspects are provided.

26 Claims, 4 Drawing Sheets

(51) Int. Cl.
  *G06F 9/50* (2006.01)
  *H04L 12/24* (2006.01)
  *G05B 19/418* (2006.01)
(52) U.S. Cl.
  CPC ........ *H04L 41/046* (2013.01); *H04L 41/0893* (2013.01); *H04L 41/0896* (2013.01); *H04L 67/1074* (2013.01); *H04L 67/1089* (2013.01); *H04L 67/12* (2013.01); *H04L 67/34* (2013.01)
(58) Field of Classification Search
  CPC ..... H04L 67/1089; H04L 67/12; H04L 67/34; G05B 19/4185; G06F 9/5038
  USPC .................................................. 709/226, 216
  See application file for complete search history.

(56) References Cited

U.S. PATENT DOCUMENTS

| | | | |
|---|---|---|---|
| 7,783,777 B1 | 8/2010 | Pabla et al. | |
| 8,935,315 B2* | 1/2015 | Hudson | D01D 5/423 |
| | | | 709/203 |
| 9,374,276 B2 | 6/2016 | Batrouni et al. | |
| 9,432,452 B2 | 8/2016 | Gibson et al. | |
| 9,549,024 B2 | 1/2017 | Leekley et al. | |
| 2011/0055312 A1* | 3/2011 | Purdy, Sr. | H04L 29/12066 |
| | | | 709/203 |
| 2012/0226767 A1* | 9/2012 | Luna | H04L 67/2842 |
| | | | 709/216 |
| 2013/0204961 A1* | 8/2013 | Fliam | H04L 67/1097 |
| | | | 709/214 |
| 2014/0280230 A1* | 9/2014 | Masato | G06F 16/487 |
| | | | 707/749 |
| 2016/0080252 A1* | 3/2016 | Ramachandran | H04L 67/141 |
| | | | 709/238 |

OTHER PUBLICATIONS

Panchal, Parag et al., "Content Delivery Networks in the Cloud with Distributed Edge Servers", 2013 IEEE 10th, International Conference on High Performance Computing and Communications & 2013 IEEE International Conference on Embedded and Ubiquitous Computing, 2013, DOI: 10.1109/HPCC.and.EUC.2013.81, (pp. 526-532, 7 total pages).

* cited by examiner

PEER BASED DISTRIBUTION OF EDGE APPLICATIONS

BACKGROUND

Industrial equipment or assets, generally, are engineered to perform particular tasks as part of industrial processes. The design and implementation of these assets often takes into account both the physics of the task at hand, as well as the environment in which such assets are configured to operate and the specific operating control these systems are assigned to. Various types of control systems communicate data between different sensors, devices, user interfaces, etc. in order to enable control operations of the industrial asset and other powered systems.

Often the control systems require applications for the execution thereof. The applications executing in control systems are typically designed such that each application maps to a particular control system function for a particular device. As such, it may be challenging to individually transmit applications (e.g., new applications or updates to existing applications) to a number of elements in an industrial asset or system.

It would be desirable to provide systems and methods to improve the sharing of applications in a system with many elements.

BRIEF DESCRIPTION

According to some embodiments, a computer implemented method includes providing an application module; receiving a request from at least one master agent for application content at the application module, wherein the application content is for execution at one or more assets; executing the application module to determine the distribution of the application content to at least one node located in each of the one or more assets, wherein execution of the application module further comprises: determining an origin of the request and a requesting hierarchy associated with the request; exchanging metadata associated with the requesting hierarchy and metadata associated with the requested application content; determining whether to distribute the application content based on an analysis of the exchanged metadata; distributing the application content to the at least one node located in the installed product based on the analysis; and generating an operating response of the asset based on the distributed application content.

According to some embodiments, a system includes an application module; a memory storing processor-executable steps; and an application processor coupled to the memory, and in communication with the application module and operative to execute the processor-executable process steps to cause the system to: receive a request from at least one master agent for application content at the application module, wherein the application content is for execution at one or more assets; determine an origin of the request and a requesting hierarchy associated with the request; exchange metadata associated with the requesting hierarchy and metadata associated with the requested application content; determine whether to distribute the application content based on an analysis of the exchanged metadata; distribute the application content to the at least one node located in an asset based on the analysis; and generate an operating response of the asset based on the distributed application content.

According to some embodiments, a non-transitory, computer-readable medium storing program code, the program code executable by a computer system to cause the computer system to: receive a request from at least one master agent for application content at the application module, wherein the application content is for execution at one or more assets; determine an origin of the request and a requesting hierarchy associated with the request; exchange metadata associated with the requesting hierarchy and metadata associated with the requested application content; determine whether to distribute the application content based on an analysis of the exchanged metadata; distribute the application content to the at least one node located in the one or more assets based on the analysis; and generate an operating response of the one or more assets based on the distributed application content.

A technical effect of some embodiments of the invention is an improved and/or computerized technique and system for distributing applications to industrial assets. Embodiments provide for the secure distribution of application content, making a more secure and efficient networked communicate system. In one or more embodiments, this includes semantic information (e.g., metadata indicating hardware space, RAM, processing bandwidth, cores, etc.) provided by the endpoint (e.g., source of request for content, and ultimate destination of content) about the endpoint to aid in the determination of whether application content is possible (e.g., can the endpoint accommodate the application content) and whether the application content certified as "safe" to send to the endpoint. One or more embodiments provide for the use of one or more constraints to establish distribution of application content. Embodiments also provide a description of what the distribution will actually look like at run-time in terms of a map of how the application may be distributed to a particular system having a set of devices. This map may be provided to at least one of a system or to a user. Some non-exhaustive examples of real world benefits include the ability to update functionality or patch issues in a control system, especially those that are difficult to access but have strict requirements on when they may be updated (e.g., drones on top of wind turbines, embedded controllers on aircraft systems). Other real world benefits include, through the mapping of the distribution, a developer of a new application may no longer have the tedious task of creating a detailed mapping to every platform that the application may be distributed to; and for an update to an existing application, the system may provide the capabilities of the end points and distribution channels to the application developer. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DETAILED DESCRIPTION

Industrial equipment or assets, generally, are engineered to perform particular tasks as part of industrial processes.

For example, industrial assets may include, among other things and without limitation, manufacturing equipment on a production line, aircraft engines, wind turbines that generate electricity on a wind farm, power plants, locomotives, health care and/or imaging devices (e.g., X-ray or MIR systems) or surgical suites for use in patient care facilities, or drilling equipment for use in mining operations. The design and implementation of these assets often takes into account both the physics of the task at hand, as well as the environment in which such assets are configured to operate and the specific operating control these systems are assigned to. Various types of control systems communicate data between elements or nodes of the industrial asset (e.g., different sensors, devices, user interfaces, etc.,) per the instructions of an application, in order to enable control operations of the industrial asset and other powered systems.

Typically, the industrial asset includes multiple nodes, and the applications may be designed to map to a specific node. As such, it may be a challenge to securely distribute an application to multiple nodes in an efficient manner.

In one or more embodiments, an application module interacts with a cloud-based management solution and a content delivery network (CDN) to download the application content (i.e., an application or application update) and ultimately distribute the application content to one or more nodes in a secure fashion. In one or more embodiments, the application module may, as part of the distribution, ensure defined policies (e.g., security, safety, operations, licensing, retention), and computer/storage/network constraints are satisfied. In one or more embodiment, the application module may ensure enforcement of policies and constraints unique to an industrial control setting.

The term "installed product" should be understood to include any sort of mechanically operational entity, asset including, but not limited to, jet engines, locomotives, gas turbines, and wind farms and their auxiliary systems as incorporated. The term is most usefully applied to large complex powered systems with many moving parts, numerous sensors and controls installed in the system. The term "installed" includes integration into physical operations such as the use of engines in an aircraft fleet whose operations are dynamically controlled, a locomotive in connection with railroad operations, or apparatus construction in, or as part of, an operating plant building, machines in a factory or supply chain, etc. As used herein, the terms "installed product," "asset," and "powered system" may be used interchangeably.

As used herein, the term "automatically" may refer to, for example, actions that may be performed with little or no human interaction.

Figure 1:
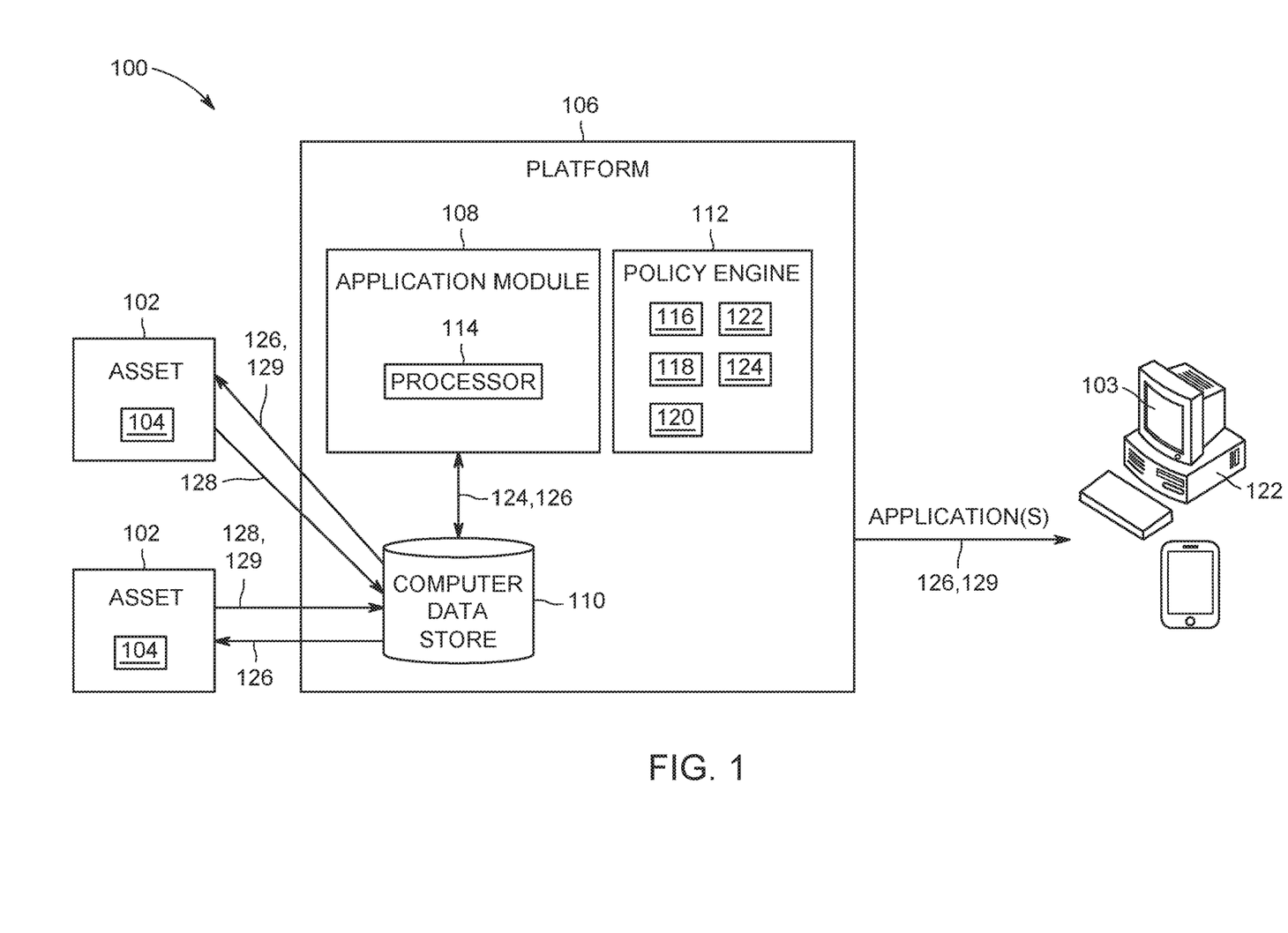
FIG. 1 illustrates a system according to some embodiments.

FIG. 1 is a block diagram of an example operating environment or system 100 in which an application module 108 may be implemented, arranged in accordance with at least one embodiment described herein. FIG. 1 represents a logical architecture for describing processes according to some embodiments, and actual implementations may include more or different components arranged in other manners.

The system 100 may include at least one "installed product" 102. While two installed products 102 are shown herein to represent a fleet of installed products 102, any suitable number may be used. It is noted that each installed product 102 communicates with a platform 106, and elements thereof, in a same manner, as described below. As noted above, the installed product 102 may be, in various embodiments, a complex mechanical entity such as the production line of a factory, a gas-fired electrical generating plant, a jet engine on an aircraft amongst a fleet (e.g., two or more aircrafts or other assets), a wind farm (e.g., two or more wind turbines), a locomotive, etc. The installed product 102 may include a considerable (or even very large) number of physical elements or components 104, which for example may include turbine blades, fasteners, rotors, bearings, support members, housings, etc. As used herein, the terms "physical element" and "component" may be used interchangeably. The installed product 102 may also include subsystems, such as sensing and localized control, in one or more embodiments.

In some embodiments, the platform 106 may include a computer data store 110 that may provide information to the application module 108 and store results from the application module 108. The application module 108 may include a policy engine 112 and one or more processing elements 114. The policy engine 112 may include a security policy 116, a safety policy 118, an operations policy 120, a licensing policy 122 and a retention policy 124. In one or more embodiments, the policy engine 112 may use the security policy 116 to determine when a request is from a trusted source. The policy engine 112 may determine whether it is safe to operate the installed product 102 in response to a received application content via the safety policy 118, in one or more embodiments. The operations policy 120 may be used by the policy engine 112 to determine whether the installed product 102 is able to operate in the manner prescribed by the received application content, in one or more embodiments. The policy engine 112 may determine whether a received application content satisfies licensing instructions per the licensing policy 122, in one or more embodiments. The retention policy 124 may determine whether the received application content is kept after is has been distributed to the appropriate elements, and the terms associated with keeping the application content when it is kept, in one or more embodiments.

The processor 114 may, for example, be a conventional microprocessor, and may operate to control the overall functioning of the application module 108. In one or more embodiments, the processor 114 may be programmed with a continuous or logistical model of industrial processes that use the one or more installed products 102.

The data store 110 may comprise any one or more systems that store data that may be used by the module. The data stored in data store 110 may be received from disparate hardware and software systems associated with the installed product 102, or otherwise, some of which are not inter-operational with one another. The systems may comprise a back-end data environment employed in a business, industrial, or personal context. The data may be pushed to data store 110 and/or provided in response to queries received therefrom.

In one or more embodiments, the data store 110 may comprise any combination of one or more of a hard disk drive, RAM (random access memory), ROM (read only memory), flash memory, etc. The data store 110 may store software that programs the processor 114 and the application module 108 to perform functionality as described herein.

The data store 110 may support multi-tenancy to separately support multiple unrelated clients by providing multiple logical database systems which are programmatically isolated from one another.

The data may be included in a relational database, a multi-dimensional database, an eXtendable Markup Language (XML) document, and/or any other structured data storage system. The physical tables of data store 110 may be distributed among several relational databases, multi-dimensional databases, and/or other data sources. The data of data store 110 may be indexed and/or selectively replicated in an index.

The data store 110 may implement as an "in-memory" database, in which volatile (e.g., non-disk-based) storage (e.g., Random Access Memory) is used both for cache memory and for storing data during operation, and persistent storage (e.g., one or more fixed disks) is used for offline persistency of data and for maintenance of database snapshots. Alternatively, volatile storage may be used as cache memory for storing recently-used database data, while persistent storage stores data. In some embodiments, the data comprises one or more of conventional tabular data, row-based data stored in row format, column-based data stored in columnar format, time series data in a time series data store, and object-based data.

The application module 108, according to some embodiments, may access the data store 110 and utilize the policy engine 112 and processing elements 114 to distribute an application content 126 to the installed product 102. In one or more embodiments, the application content 126 may be transmitted to various user platforms 122 or to other systems (not shown), as appropriate (e.g., for display to, and manipulation by, a user). In one or more embodiments, the distributed application content 126 may be used to operate the installed product 102, operate another system, or by input to another system.

In one or more embodiments, as described above, application content 126 may be one of an application and an application update. The application content 126 may comprise server-side executable program code (e.g., compiled code, scripts, etc.) executing within a processor 116 to receive queries from clients and provide results to clients based on engine policy data and data in the data store. Each client (not shown) may comprise one or more individuals or devices executing program code of a software application. One or more applications may communicate with the policy engine 112 and data store 110 using database management interfaces, such as, but not limited to Open Database Connectivity (ODBC) and Java Database Connectivity (JDBC) interfaces. These applications may use Structured Query Language (SQL) to manage and query data stored in the policy engine 112 and data store 110. Data store 110 may store data used by the applications. The data store may comprise any query-responsive data source or sources that are or become known, including but not limited to a structured-query language (SQL) relationship.

In one or more embodiments, the application module 108 may be executed to receive a request to transmit an application 126 to the requestor, and to return the application 126 to the requestor. In one or more embodiments, a node that directly requests the application from the application module 108 may be one of the source node that will execute the application 126 or may be an intermediate distribution node that may request the application on behalf of the node that will execute the application 126. As used herein, "node" may refer to a generic hardware platform that may ask and participate in an application environment (e.g., module transfers and execution). As it is a hardware platform, it may have physical resources to execute an application, as well as thin-layer resources on top of the physical resources that may allow it, via API, etc. to participate in module transfer and execution. As used herein, a "source node" may refer to the node originating the request. In one or more embodiments, two or more nodes may be at least one of physically and geographically distributed in one or more installed products 102. In one or more embodiments, the two or more nodes may be constructed and configured for electronic communication.

A communication channel 128 may be included in the system 100 to supply input from at least one of the installed product 102 and the data store 110 to the application module 108.

In some embodiments, the system 100 may also include a communication channel 129 to supply output (e.g., the application content 126) from the application module 108 to at least one of: user platforms 122, the installed product or to other systems. In some embodiments, received applications may cause modification in the state or condition or another attribute of the installed product 102.

Figure 3:
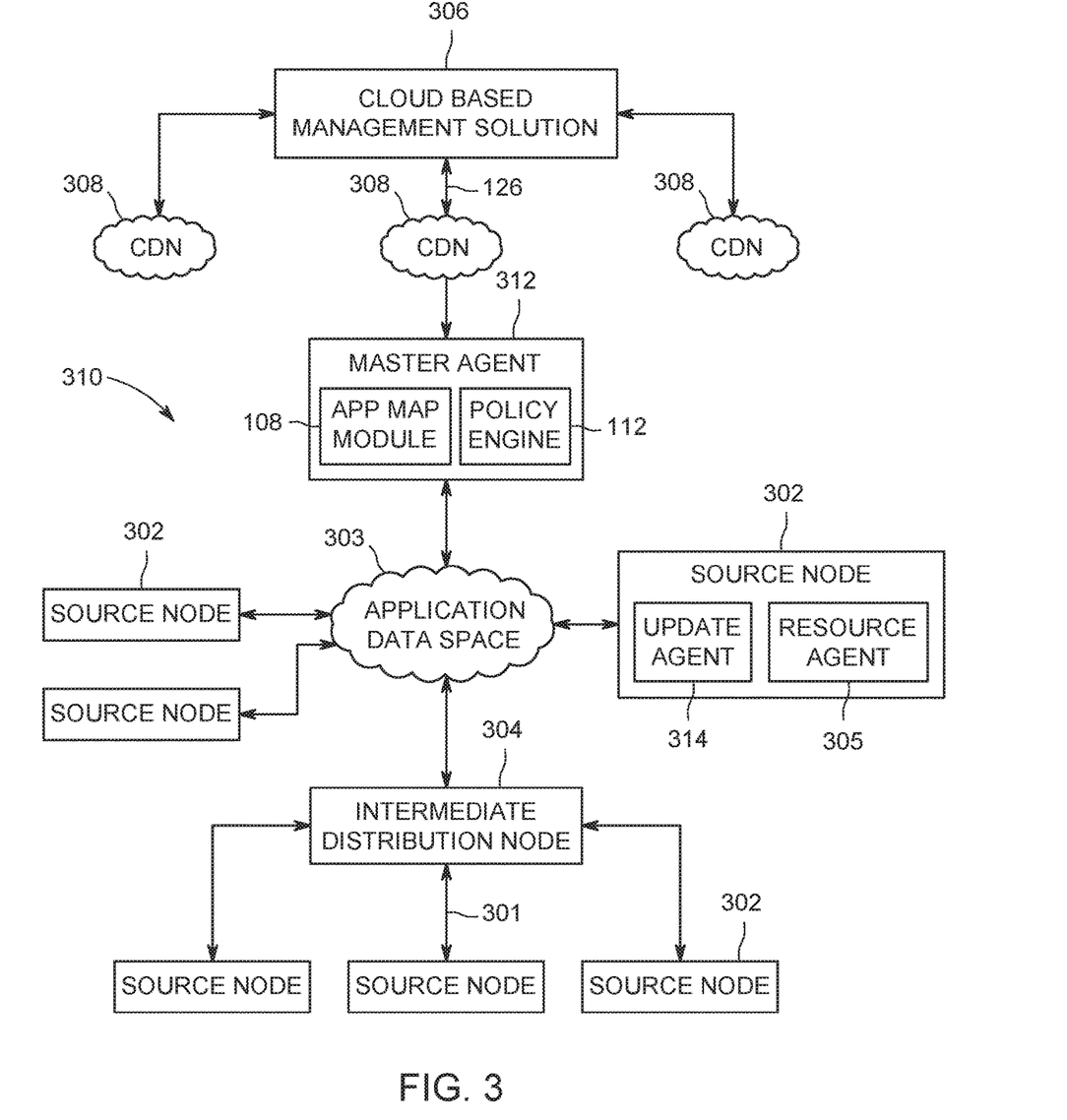
FIG. 3 illustrates a block diagram of a system according to some embodiments.

As used herein, devices, including those associated with the system 100 and any other devices described herein, may exchange information and transfer input and output ("communication") via any number of different systems, including a Content Distribution Network (CDN) 308 (FIG. 3). In one or more embodiments, the CDN 308 may receive the application content 126 from a cloud-based management solution (e.g. Predix, AWS, etc). The CDN 308 may be geographically located near the asset 102. It is noted that while the CDN 308 may be located away from the asset, a benefit of using a CDN is to keep the content near where it is being used to minimize latency. Then, as described further below, the CDN 308 may distribute the application content 126 to the application module 108, and particularly to a master agent 312 (FIG. 3), who may distribute the application content 126 to a hierarchical structure 310 (FIG. 3) of one or more nodes 302, 304, who may distribute the application content amongst themselves in a peer-to-peer (P2P) format.

In one or more embodiments, the CDN may make use of communication networks to deliver the content. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

A user may access the system 100 via one of the user platforms 122 (a control system, a desktop computer, a laptop computer, a personal digital assistant, a tablet, a smartphone, etc.) to view information about and/or manage the installed product 102 in accordance with any of the embodiments described herein.

Figure 2:
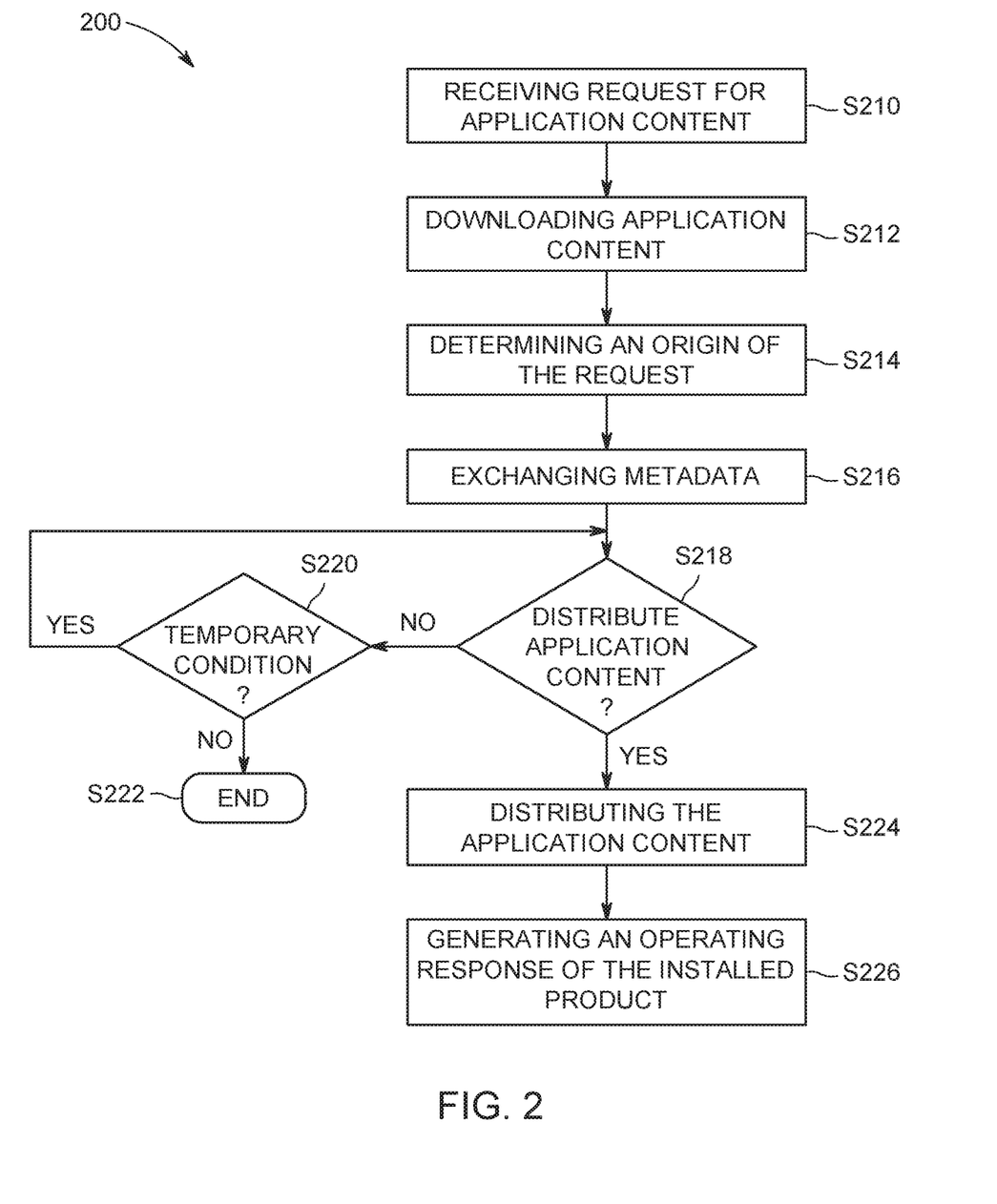
FIG. 2 illustrates a flow diagram according to some embodiments.

Turning to FIGS. 2-3, a flow diagram and associated block diagram, of an example of operation according to some embodiments is provided. In particular, FIG. 2 provides a flow diagram of a process 200, according to some embodiments. Process 200, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the process 200 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

Initially, at S210, a request 301 (FIG. 3) for application content 126 is received. In one or more embodiments, the application content 126 may be for execution at one or more installed products 102. In one or more embodiments, the request 301 may be transmitted from a request source node 302 ("source node") (FIG. 3) to the application module 108. In one or more embodiments, the source node 302 may be a node in an installed product 102. In one or more embodiments, the source node 302 may be an embedded control (e.g., a supervisory control platform) within the installed product 102. While the process 200 herein is described with respect to a single source node 302, the system 100 may include multiple source nodes 302 located in multiple installed products 102, and each requesting the application content 126 at one of: the same, substantially the same, and different times.

In one or more embodiments, the request 301 is transmitted from the source node 302 and through a hierarchical structure 310 ("hierarchy") en route to the application module 108, and may not be directly transmitted from the source node 302 to the application module 108. In one or more embodiments, the hierarchical structure 310 may include one or more intermediate distribution nodes 304 in one or more tiers. It is also noted that while FIG. 3 shows an example of a single instance, multiple instances at each level of the hierarchy may be repeated multiple times under each CDN 308, and under each Master Agent 312.

The intermediate distribution nodes 304 may include a variety of heterogenous nodes having different abilities to receive the application content 126 and deliver the application content 126. In one or more embodiments, the intermediate distribution nodes 304 may include a variety of homogenous nodes, having the same ability to receive the application content 126 and deliver the application content 126. In one or more embodiments, the intermediate distribution nodes 304 may include both homogenous and heterogenous nodes. The network of nodes (302, 304) may have different device topologies. In one or more embodiments, the intermediate distribution nodes 304 may have an understanding of the topology of the network of nodes (302, 304) sitting below them in the hierarchy, and may determine an optimal way to route the requested application content 126 to the network of nodes, and ultimately the source node 302. In one or more embodiments, the intermediate distribution nodes 304 may not be able to use the application content 126 themselves, and may instead distribute the application content 126. In one or more embodiments, each intermediate distribution node 304 may add details related to its physical structure to the request prior to sending the request 301 to the next tier. In one or more embodiments, the intermediate distribution nodes 304 may use a distributed application data space 303 to communicate semantic information used for receiving and assembling complete payload. The application data space 303 may be a shared data repository, where, instead of each node maintaining the data for the application, the application may be retrieved the data from the application data space 303, as needed. In one or more embodiments, the application data space 303 may have an executable capability in that portions of the data that may be needed for an application are local, and may be exposed to other nodes that may need to make use of it. From a logic perspective, the application appears to be retrieving a single instance or instantiation of the data, but in reality, the data may be distributed simultaneously over multiple nodes. A benefit of using the application data space 303 may be that applications may be executed and distributed in a logical domain, and the system may determine how to make the application work in the physical system (e.g., at the node). In one or more embodiments, the intermediate distribution nodes 304 may interact with each other in a Peer-to-Peer (P2P) fashion to efficiently distribute the application content 126 to the source nodes 302.

It is also noted that the application content 126 may be divided into smaller pieces by the application module 108 to facilitate distribution to the source node 302. In one or more embodiments, the application module 108 may divide the application content 126 based on metadata associated with the node network (302, 304) and the application itself. For example, if the application metadata indicates the application needs eight cores of processing to run, but there are only two nodes, each with four cores, the application module 108 may split the application and allow it to run on the two different nodes, and the module 108 may manage the data exchange that needs to happen for execution of the application. After the pieces of the application are executed on different nodes, the data output from each executed piece may be re-assembled and sent to the source node 302. As described further below, the results from the executed smaller pieces may be assembled by the intermediate distribution nodes 304 into a complete application content 126 at another application data space that sits behind the intermediate distribution node, before being finally distributed to the source node. In one or more embodiments, an update agent 314 may reside at the source node 302 to facilitate transmission of the application content 126 to the source node. In one or more embodiments, a resource agent 305 may analyze and monitor the resources (e.g., available processing, memory, bandwidth, etc.) required/available and may provide an interface/communication to what may be available to the application(s) being distributed. For example, the resource agent 305 may identify if the system has four physical processing cores and two are available; or if the system has 16 GB of RAM and 4 GB is available to new applications.

Then in S212, the application module 108 requests the application content 126 be downloaded from a cloud-based management solution 306 to a master agent 312 via a Content Delivery Network (CDN) 308. In one or more embodiments, the master agent 312 may manage request among a number of different requestors (e.g., source nodes and intermediate nodes) at a same, or approximately same time. In one or more embodiments, the master agent 312 may run within a particular platform/module and may orchestrate any elements below it. A benefit provided by the master agent 312 may be that it provides a point of tent so that all lower devices in a hierarchy may not have to be working through the cloud based management solution directly to retrieve data/applications. In one or more embodiments, the application content 126 may include the application itself (either the original application or an update), as well as metadata associated with the application content. For example, the application metadata content may include CPU, RAM, Disk, I/O devices (e.g., sensors, actuators etc.). Other suitable metadata content may be included.

Next, in S214, the application module 108 determines an origin of the request 301 and the hierarchy 310 associated with the request 301. In one or more embodiments, the request 301 may include metadata describing an identity, roles, and credentials of the source node 302. It is noted that in addition to S214 following S212, or the steps being reversed, S212 and S214 may occur at the same time or at substantially the same time.

Metadata associated with the source node 302 and hierarchy 310 is exchanged with metadata associated with the application content 126 in S216. In one or more embodiments, the application module 108 may exchange the metadata of the hierarchy 310/source node 302 with the metadata for the application at the master agent 312. In one or more embodiments, metadata may include information to determine if the application content 126 is designed for the device hosting the node; and/or the type of content (e.g., executable, virtual machine, container, configuration file, replacement OS, etc.). In one or more embodiments, the application module 108 may determine whether the application module 108 is configured to support the distribution of the application and support the content itself.

Then in S218, the policy engine 112 at the master agent 312 analyzes the received application metadata and the hierarchy 310/source node 302 metadata to determine whether the application content 126 may be distributed to the source node 302. In one or more embodiments, the policy engine 112 may apply the different policies (i.e. security policy 116, safety policy 118, operations policy 120, licensing policy 122, retention policy 124) to the metadata to determine whether the application content 126 may be distributed to the source node 302 that requested the application content 126. The determination may be based on correspondence between the metadata associated with the requesting hierarchy and the metadata associated with the requested application content 126. In one or more embodiments, the policies may be dynamic. Each node may include metadata with policies that relate to itself, such that the node has the policies it needs to make decisions relative to itself.

For example, as described above, the policy engine 112 may use the security policy 116 to determine when the request 301 is from a trusted source. In one or more embodiments, the security policy 116 may determine whether the application content includes one or more credentials for distribution. In one or more embodiments, the node 302 may have a plurality of credentials based on its job within the system 100. As a non-exhaustive example, there may be three source nodes 302 A, B and C requesting the application content 126. However, based on the metadata for each source node 302, the policy engine 112 determines that source node A 302 has different capabilities or is not authorized to handle the application content 126. As such, the application content 126 may only be sent to source nodes B and C.

The safety policy 118, as described above, may be used by the policy engine 112 to determine whether the installed product 102 will operate in a safe manner when the application content 126 is executed. As a non-exhaustive example, a turbine power plant may have a request for an update from three controllers. The safety policy 118 may indicate that the application update may only be applied when the turbine is not operating. In this example, the application content 126 may only be sent to one of the three controllers because only one turbine is not operating; and the application content 126 may be held by a node one level higher up in the hierarchy from the nodes being updated until the other two turbines are not operating.

As described above, the operations policy 120 may be used by the policy engine 112 to determine whether the installed product 102 is able to operate in the manner prescribed by the received application content 126, in one or more embodiments. In one or more embodiments, the operations policy 120 may include data about how to use shared bandwidth. For example, the bandwidth for accepting the download of the application content 126 may also be the bandwidth used for control activities of the application content 126. As such, the operations policy 120 may indicate that the download of the application content 126 may not interfere with the operations of the system, and the download may therefore not use more than 80% of the bandwidth. As another non-exhaustive example, a source node 302 may request application content 126, and the operations policy 120 may indicate that the application content 126 may not be compatible or appropriate for the source node 302. For example, the application content 126 may be compatible for a cell phone, but may not be executable on a PC.

The licensing policy 122, as described above, may be used by the policy engine 112 to determine whether a given node 302, 304 may receive the application content 126 based on a licensing agreement. As a non-exhaustive example, a wind farm may have a number of wind turbines, with only half of them licensed to receive a particular update provided by the application content 126.

As described above, the retention policy 124 may, in one or more embodiments, determine how the application content 126 is distributed, whether the received application content 126 is kept after it has been distributed, and the terms associated with keeping the application content 126 when it is kept. The retention policy 124 may, for example, determine whether, after distribution, the intermediate nodes 304 may delete the locally stored application content 126, or maintain the locally stored application content 126. Additionally, the retention policy 124 may be used by the system 100 after the application content 126 has been distributed to nodes 302 of the installed product 102, and executed thereon. Consider the following non-exhaustive example, if the application content 126 does not work or when a new installed product 102 is added to the system 100, the system 100 may use retention policy 124 to determine where the application content 126 is stored so that it may be removed in the case of the application content not working, or transmitted to the new installed product 102 for execution thereon.

As another non-exhaustive example, an application content update may not be deployed to all of the installed products 102 simultaneously. Rather, the update may be a rolling update, where the application content 126 is sent in a segmented manner. In this example, the retention policy 124 may indicate that industrial products B and C may not receive the application content update if industrial product A fails and if B and C are similar to A. In one or more embodiments, the retention policy 124 may determine the number of nodes 302 the application content 126 may be distributed to at one time. For example, if there are one hundred turbines, the retention policy 124 may indicate that only 5 turbines should receive the application content at a time, this way if a problem occurs with the application content 126 it may not affect all wind turbines at the same time.

The inventors note that it may be beneficial from an efficiency aspect to maintain the application content 126 locally, as the content is still present on the network, if needed, as compared to having to download the application content 126 from the cloud based management solution 306.

In one or more embodiments, the analysis of each policy may include a ranking. In one or more embodiments, even if less than all of the considered policies indicate the application content 126 should be distributed, the application content 126 may still be distributed based on the ranking of the policies that indicated distribution compared to those that indicated not to distribute the application content 126. For example, when the policy indicates that sensor data should be collected at 20 MHz, but only 10 MHz is available, the sensor data may still be collected. It is noted that a reduced functionality may be better than not executing at all.

Turning back to the process 200, in one or more embodiments, when it is determined in S218 that the application content 126 may not be distributed to the source node 302, the process 200 may proceed to S220, where it may be determined whether the application content 126 is waiting for a temporary condition to pass to be distributed. When it is determined in S220 that no temporary conditions are present, the process 200 ends in S222. When it is determined in S220 that an outstanding condition is present, the process may proceed back to S218. Continuing with the non-exhaustive example of the turbine power plant described above, only one of the three turbines was allowed to receive the update at the time because the operations policy 120 indicated to receive the update, the turbine could not be operating. When a second turbine is not operating, the temporary condition (ie. Operating) is no longer present, and the second turbine may receive the application content 126.

When it is determined in S218 that the application content 126 should be distributed to the source node 302, the process may proceed to S224, and the application content 126 is distributed. In one or more embodiments, the process 200 may then proceed to S226, and an operating response of the installed product 102 may be generated based on receipt of the distributed application content.

Figure 4:
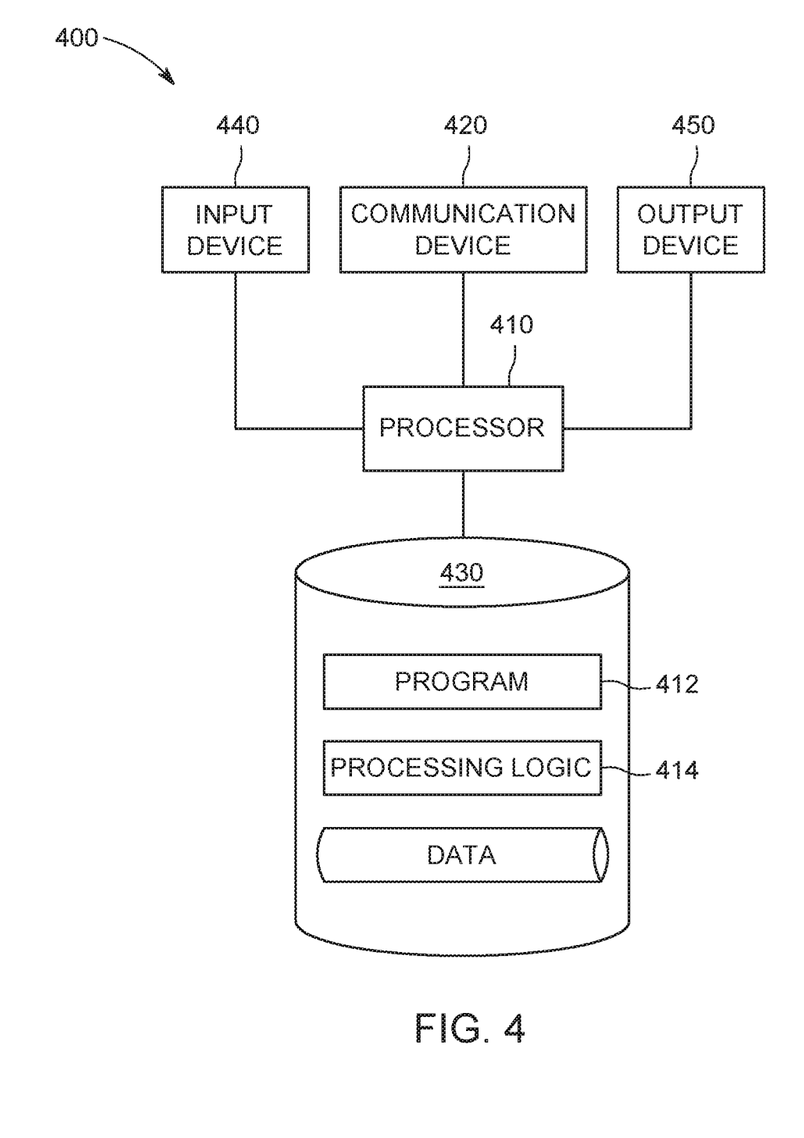
FIG. 4 illustrates a block diagram of a system according to some embodiments.

Note the embodiments described herein may be implemented using any number of different hardware configurations. For example, FIG. 4 illustrates an application platform 400 that may be, for example, associated with the system 100 of FIG. 1. The application platform 400 comprises an application processor 410 ("processor"), such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more users. The application platform 400 further includes an input device 440 (e.g., a mouse and/or keyboard to enter information) and an output device 450 (e.g., to output the outcome of application execution).

The processor 410 also communicates with a memory/storage device 430. The storage device 430 may comprise any appropriate information storage device, including combinations of magnetic storage devices (e.g., a hard disk drive), optical storage devices, mobile telephones, and/or semiconductor memory devices. The storage device 430 may store a program 412 and/or application processing logic 414 for controlling the processor 410. The processor 410 performs instructions of the programs 412, 414, and thereby operates in accordance with any of the embodiments described herein. For example, the processor 410 may receive data and then may apply the instructions of the programs 412, 414 to determine whether the application content may be distributed.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

As used herein, information may be "received" by or "transmitted" to, for example: (i) the platform 400 from another device; or (ii) a software application or module within the platform 400 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 410 (FIG. 4). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A computer implemented method comprising:
providing an application module;
receiving a request from at least one master agent for application content at the application module, wherein the application content is for execution at one or more assets;
executing the application module to determine the distribution of the application content to at least one node located in each of the one or more assets, wherein execution of the application module further comprises:
determining an origin of the request and determining a requesting hierarchy associated with the request, wherein the requesting hierarchy includes at least one intermediate distribution node the request passes through en route from the origin to the master agent;
determining, via the at least one intermediate distribution node, a route for the application content through any nodes sitting below the intermediate distribution node in the requesting hierarchy;
exchanging metadata associated with the requesting hierarchy and metadata associated with the requested application content;
determining whether to distribute the application content based on an analysis of the exchanged metadata;
distributing the application content to the at least one node located in the asset based on the analysis; and
generating an operating response of the asset based on the distributed application content.

2. The method of claim 1, wherein application content is one of an application and an application update.

3. The method of claim 1 wherein the exchanged metadata further comprises at least one of: a security policy, a safety policy, an operating policy, a retention policy, and a licensing policy.

4. The method of claim 3, wherein analyzing the exchanged metadata further comprises:
determining a correspondence between the metadata associated with the requesting hierarchy and the metadata associated with the requested application content.

5. The method of claim 3, wherein analyzing the exchanged operating policy further comprises:
determining operation of both the asset and distribution of the application content substantially simultaneously on a common bandwidth does not exceed a bandwidth limit and does not exceed an operational impairment limit.

6. The method of claim 3, wherein analyzing the exchanged security policy further comprises:
determining the application content includes one or more credentials for distribution.

7. The method of claim 1, wherein the requesting hierarchy includes two or more nodes, and the analysis is of the metadata associated with each node.

8. The method of claim 7, wherein the two or more nodes are at least one of physically and geographically distributed in one or more assets.

9. The method of claim 8, wherein two or more nodes are constructed and configured for electronic communication.

10. The method of claim 9, wherein at least two nodes are source nodes.

11. The method of claim 10, wherein the source nodes consume a same application content based on the analysis.

12. The method of claim 1, wherein the one or more intermediate distribution nodes are associated with the asset.

13. A system comprising:
an application module;
a memory storing processor-executable steps; and
an application processor coupled to the memory, and in communication with the application module and operative to execute the processor-executable process steps to cause the system to:
receive a request from at least one master agent for application content at the application module, wherein the application content is for execution at one or more assets;
determine an origin of the request and determine a requesting hierarchy associated with the request, wherein the requesting hierarchy includes at least one intermediate distribution node the request passes through en route from the origin to the master agent;
determine, via the at least one intermediate distribution node, a route for the application content through any nodes sitting below the intermediate distribution node in the requesting hierarchy;
exchange metadata associated with the requesting hierarchy and metadata associated with the requested application content;
determine whether to distribute the application content based on an analysis of the exchanged metadata;
distribute the application content to the at least one node located in one or more assets based on the analysis; and
generate an operating response of the one or more assets based on the distributed application content.

14. The system of claim 13, wherein application content is one of an application and an application update.

15. The system of claim 13 wherein the exchanged metadata further comprises at least one of: a security policy, a safety policy, an operating policy, a retention policy, and a licensing policy.

16. The system of claim 15, wherein analyzing the exchanged metadata further comprises process steps to cause the system to:
determine a correspondence between the metadata associated with the requesting hierarchy and the metadata associated with the requested application content.

17. The method of claim 15, wherein analyzing the exchanged operating policy further comprises process steps to cause the system to:
determine operation of both the asset and distribution of the application content substantially simultaneously on a common bandwidth does not exceed a bandwidth limit and does not exceed an operational impairment limit.

18. The system of claim 15, wherein analyzing the exchanged security policy further comprises process steps to cause the system to:
determine the application content includes one or more credentials for distribution.

19. The system of claim 13, wherein the requesting hierarchy includes two or more nodes, and the analysis is of the metadata associated with each node.

20. A non-transitory computer-readable medium storing program code, the program code executable by a computer system to cause the computer system to:
receive a request from at least one master agent for application content at the application module, wherein the application content is for execution at one or more assets;
determine an origin of the request and determine a requesting hierarchy associated with the request, wherein the requesting hierarchy includes at least one intermediate distribution node the request passes through en route from the origin to the master agent;
determine, via the at least one intermediate distribution node, a route for the application content through any nodes sitting below the intermediate distribution node in the requesting hierarchy;
exchange metadata associated with the requesting hierarchy and metadata associated with the requested application content;
determine whether to distribute the application content based on an analysis of the exchanged metadata;
distribute the application content to the at least one node located in the one or more assets based on the analysis; and
generate an operating response of the one or more assets based on the distributed application content.

21. The medium of claim 20, wherein application content is one of an application and an application update.

22. The medium of claim 21, wherein the requesting hierarchy includes two or more nodes, and the analysis is of the metadata associated with each node.

23. The medium of claim 20 wherein the exchanged metadata further comprises at least one of: a security policy, a safety policy, an operating policy, a retention policy, and a licensing policy.

24. The medium of claim 23, wherein analyzing the exchanged metadata further comprises program code to cause the system to:
determine a correspondence between the metadata associated with the requesting hierarchy and the metadata associated with the requested application content.

25. The medium of claim 23, wherein analyzing the exchanged operating policy further comprises program code to cause the system to:
determine operation of both the asset and distribution of the application content substantially simultaneously on a common bandwidth does not exceed a bandwidth limit and does not exceed an operational impairment limit.

26. The medium of claim 23, wherein analyzing the exchanged security policy further comprises program code to cause the system to:
determine the application content includes one or more credentials for distribution.

\* \* \* \* \*